No. 826,655.
PATENTED JULY 24, 1906.
S. H. GARST.
DRAFT ATTACHMENT FOR DISK HARROWS.
APPLICATION FILED JAN. 2, 1906.
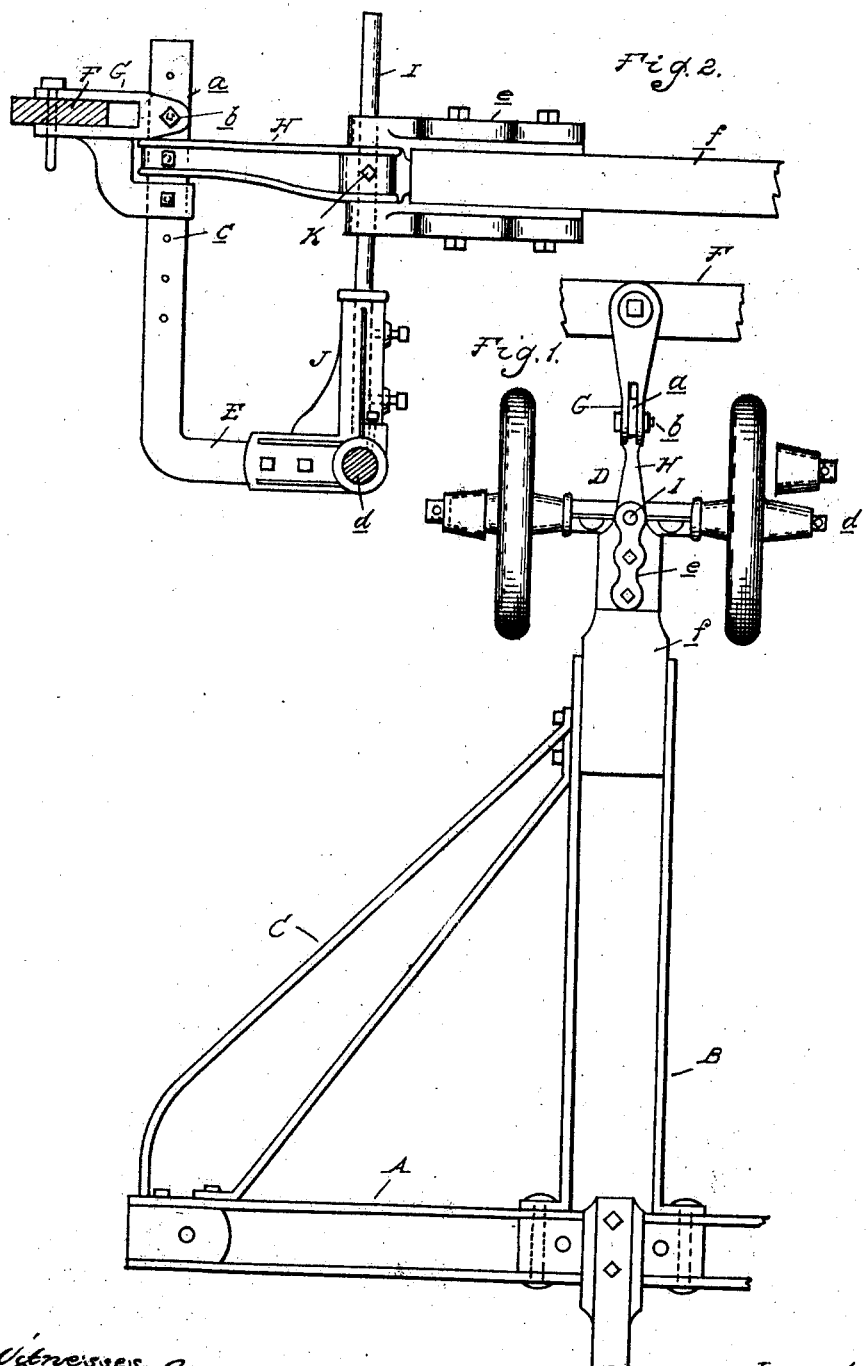

UNITED STATES PATENT OFFICE.

STEPHEN H. GARST, OF DETROIT, MICHIGAN, ASSIGNOR TO AMERICAN HARROW COMPANY, OF DETROIT, MICHIGAN, A CORPORATION OF MICHIGAN.

DRAFT-ATTACHMENT FOR DISK HARROWS.

No. 826,655.   Specification of Letters Patent.   Patented July 24, 1906.

Application filed January 2, 1906. Serial No. 294,272.

*To all whom it may concern:*

Be it known that I, STEPHEN H. GARST, a citizen of the United States of America, residing at Detroit, in the county of Wayne and State of Michigan, have invented certain new and useful Improvements in Draft Attachments for Disk Harrows, of which the following is a specification, reference being had therein to the accompanying drawings.

The invention relates to draft attachments particularly designed for use in connection with disk harrows, but applicable also to other agricultural machinery; and it is the object of the invention to obtain a construction in which a turn may be made by the team in a smaller space than where the usual draft-tongue is employed.

The invention consists in the peculiar construction, as hereinafter set forth.

In the drawings, Figure 1 is a plan view of the draft mechanism. Fig. 2 is a side elevation of the forward part of the construction illustrated in Fig. 1.

A is the frame for the disk harrow or other agricultural implement. (Not further illustrated.) In place of the usual draft-tongue connected to said frame I provide a stub-tongue B, which is secured to the frame A, projecting forward therefrom and preferably strengthened by a diagonal brace C. The forward end of the stub-tongue B is supported upon a swivel-truck D, which is provided with a forwardly-extending arm E, to which the whiffletree F is connected. Thus the truck will be turned upon its swivel with any change of direction in draft upon the whiffletree.

To permit of vertical adjustment of the whiffletree, it is connected to the arm E by a clevis G, which engages a vertical portion *a* of said arm E and is connected by bolts *b* engaging apertures *c*. H is a direct-draft connection extending from the point of attachment of the clevis to the stub-tongue B and comprising a link, which is apertured at opposite ends and is sleeved upon the vertical portion *a* of the arm E and a vertical rod I, which forms the swivel of the truck. This rod I is preferably secured to a casting J, which is socketed to receive the same, and said casting forms the journal for the truck-axle *d* and a bearing for the attachment of the arm E. The link H engages the vertical rod I between furcations in the forward end of the stub-tongue B, which latter is preferably formed of an end member *e*, which is bifurcated, and separated bars *f*, which extend back to the frame.

With the construction just described it will be understood that the connection in the direct line of draft extends from the frame A to the whiffletree F, said connection comprising a stub-tongue B, with its bifurcated member *e*, the link H, and the clevis G. This draft connection is maintained in each adjustment of the clevis G, as the link H is slidable upward or downward upon the bar *a* and also upon the bar I and being secured to the latter by a set-screw K. At the same time the rod I is free to turn in the bifurcated bearing of the member *e*, so as to permit of the swivel of the truck. Thus in use the team attached to the whiffletree can take a short turn and in so doing will swing the arm E and turn the truck D, while at all times the draft is directly through the link H and stub-shaft B.

What I claim as my invention is—

1. A draft attachment for agricultural instruments comprising a stub-tongue, a truck for supporting the forward end of said tongue and having a swivel connection therewith, a draft-arm extending forward from said truck, a link extending from said draft-arm to said stub-tongue and a clevis vertically adjustable on said draft-arm and secured thereto above and below said link for maintaining a direct line of draft.

2. A draft attachment for agricultural implements comprising a stub-tongue, a truck for supporting the forward end of said tongue, a swivel-shaft extending vertically upward from said truck and engaging a bearing in said stub-tongue, a forwardly-extending draft-arm on said truck having an upwardly-extending end portion, a link connecting said swivel-shaft and the upward extension of said draft-arm and vertically adjustable thereon and a clevis vertically adjustably secured to said upward extension of said draft-arm above and below said link, for the purpose described.

3. A draft attachment for agricultural implements comprising a stub-tongue, a bifurcated bearing at the forward end thereof, a vertical shaft swiveled in said bifurcated bearing, a truck supporting said shaft and draft-arm extending forward from said truck and upward parallel to said swivel-shaft a clevis having a bifurcated vertically - adjustable bearing engaging the upward extension of said draft-arm and a link sleeved upon said draft-arm and upon said swivel-shaft intermediate the furcations of said stub-tongue and clevis and vertically adjustable therewith in relation to said truck.

In testimony whereof I affix my signature in presence of two witnesses.

STEPHEN H. GARST.

Witnesses:
W. E. KIRBY,
V. L. COLLINSON.